United States Patent
Henry

[11] Patent Number: 5,964,323
[45] Date of Patent: Oct. 12, 1999

[54] BRAKE DRUM COOLING DEVICE

[76] Inventor: Merle A. Henry, 6508 N. 9th Ave., Sioux Falls, S. Dak. 57104

[21] Appl. No.: 08/827,959

[22] Filed: May 13, 1997

[51] Int. Cl.⁶ .................................................. F16D 65/827
[52] U.S. Cl. ................................... 188/264 R; 188/218 R
[58] Field of Search ........................... 188/264 R, 264 A, 188/264 AA, 264 F, 77 R, 77 W, 113.2; 192/113.21, 113.23; 301/6.3

[56] References Cited

U.S. PATENT DOCUMENTS

| | | |
|---|---|---|
| D. 199,307 | 10/1964 | Troy . |
| D. 212,217 | 9/1968 | John . |
| 1,881,002 | 10/1932 | Udale ................................... 188/264 R |
| 1,912,789 | 6/1933 | Norton . |
| 2,659,459 | 11/1953 | Lyon ................................... 188/264 R |
| 2,659,460 | 11/1953 | Lyon ................................... 188/264 R |
| 2,998,870 | 9/1961 | Herman et al. . |
| 3,127,959 | 4/1964 | Wengrowski . |
| 3,142,364 | 7/1964 | Mikkelson ........................... 188/264 R |
| 3,767,015 | 10/1973 | Odier . |
| 3,986,586 | 10/1976 | Mauger et al. . |
| 4,621,715 | 11/1986 | Denton ................................. 188/264 R |
| 4,830,150 | 5/1989 | Denton . |
| 5,383,537 | 1/1995 | White . |

Primary Examiner—Chris Schwartz

[57] ABSTRACT

A brake drum cooling device for forcing air across the exterior surface of a brake drum when the brake drum rotates, thereby dissipating heat therefrom, includes an elongated band secured in an end-to-end manner externally around a brake drum. The elongated band includes a plurality of air scoops formed unitarily thereon wherein each of the air scoops capture and direct air across the exterior surface of the brake drum when the brake drum is rotated in a forward direction.

20 Claims, 3 Drawing Sheets

BRAKE DRUM COOLING DEVICE

BACKGROUND OF THE INVENTION

1. Field of the Invention

The present invention relates to cooling devices for automotive brakes and more particularly pertains to a new Brake Drum Cooling Device for forcing air across the exterior surface of a brake drum when the brake drum rotates, thereby dissipating heat therefrom.

2. Description of the Prior Art

The use of cooling devices for automotive brakes is known in the prior art. More specifically, cooling devices for automotive brakes heretofore devised and utilized are known to consist basically of familiar, expected and obvious structural configurations, notwithstanding the myriad of designs encompassed by the crowded prior art which have been developed for the fulfillment of countless objectives and requirements.

Known prior art cooling devices for automotive brakes include U. S. Pat. No. 5,121,972; U.S. Pat. No. 4,620,616; U.S. Pat. No. 4,901,826; U.S. Pat. No. 4,989,697; U.S. Pat. No. 4,979,597; U.S. Pat. No. 4,326,610; U.S. Pat. No. 4,830,150; U.S. Pat. No. 4,674,606; U.S. Pat. No. 5,383,539; U.S. Pat. No. 4,503,944; U.S. Pat. No. 4,621,715; and U.S. Pat. No. D346,778.

While these devices fulfill their respective, particular objectives and requirements, the aforementioned patents do not disclose a new Brake Drum Cooling Device. The inventive device includes an elongated band secured in an end-to-end manner externally around a brake drum. The elongated band includes a plurality of air scoops formed unitarily thereon wherein each of the air scoops capture and direct air across the exterior surface of the brake drum when the brake drum is rotated in a forward direction.

In these respects, the Brake Drum Cooling Device according to the present invention substantially departs from the conventional concepts and designs of the prior art, and in so doing provides an apparatus primarily developed for the purpose of forcing air across the exterior surface of a brake drum when the brake drum rotates, thereby dissipating heat therefrom.

SUMMARY OF THE INVENTION

In view of the foregoing disadvantages inherent in the known types of cooling devices for automotive brakes now present in the prior art, the present invention provides a new Brake Drum Cooling Device construction wherein the same can be utilized for forcing air across the exterior surface of a brake drum when the brake drum rotates, thereby dissipating heat therefrom.

The general purpose of the present invention, which will be described subsequently in greater detail, is to provide a new Brake Drum Cooling Device apparatus and method which has many of the advantages of the cooling devices for automotive brakes mentioned heretofore and many novel features that result in a new Brake Drum Cooling Device which is not anticipated, rendered obvious, suggested, or even implied by any of the prior art cooling devices for automotive brakes, either alone or in any combination thereof.

To attain this, the present invention generally comprises an elongated band secured in an end-to-end manner externally around a brake drum. The elongated band includes a plurality of air scoops formed unitarily thereon wherein each of the air scoops capture and direct air across the exterior surface of the brake drum when the brake drum is rotated in a forward direction.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new Brake Drum Cooling Device apparatus and method which has many of the advantages of the cooling devices for automotive brakes mentioned heretofore and many novel features that result in a new Brake Drum Cooling Device which is not anticipated, rendered obvious, suggested, or even implied by any of the prior art cooling devices for automotive brakes, either alone or in any combination thereof.

It is another object of the present invention to provide a new Brake Drum Cooling Device which may be easily and efficiently manufactured and marketed.

It is a further object of the present invention to provide a new Brake Drum Cooling Device which is of a durable and reliable construction.

An even further object of the present invention is to provide a new Brake Drum Cooling Device which is susceptible of a low cost of manufacture with regard to both materials and labor, and which accordingly is then susceptible of low prices of sale to the consuming public, thereby making such Brake Drum Cooling Device economically available to the buying public.

Still yet another object of the present invention is to provide a new Brake Drum Cooling Device which provides in the apparatuses and methods of the prior art some of the advantages thereof, while simultaneously overcoming some of the disadvantages normally associated therewith.

Still another object of the present invention is to provide a new Brake Drum Cooling Device for forcing air across the exterior surface of a brake drum when the brake drum rotates, thereby dissipating heat therefrom.

Yet another object of the present invention is to provide a new Brake Drum Cooling Device which includes an elongated band secured in an end-to-end manner externally around a brake drum. The elongated band includes a plurality of air scoops formed unitarily thereon wherein each of the air scoops capture and direct air across the exterior surface of the brake drum when the brake drum is rotated in a forward direction.

Still yet another object of the present invention is to provide a new Brake Drum Cooling Device that continually draws and directs air across the exterior surface of a brake drum whenever the vehicle is moving in a forward direction.

Even still another object of the present invention is to provide a new Brake Drum Cooling Device that reduces heating of the brake drum thereby reducing associated problems such as cracking of the brake drum and squealing brakes both of which can result from overheating of the brake drum.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
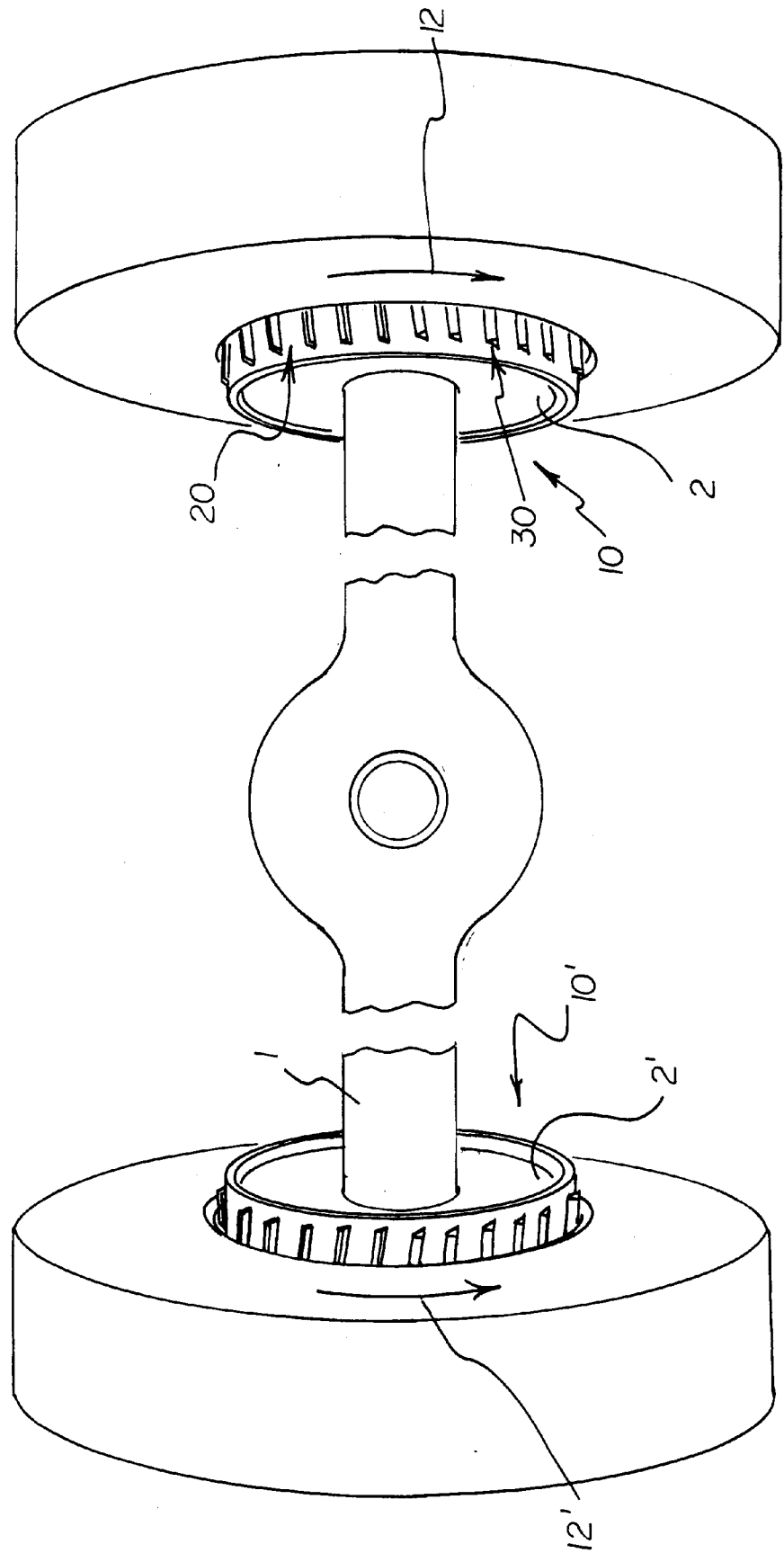
FIG. 1 is a perspective view of a new Brake Drum Cooling Device installed on the brake drums provided at opposite ends of an axle of a vehicle according to the present invention.

With reference now to the drawings, and in particular to FIGS. 1 through 6 thereof, a new Brake Drum Cooling Device embodying the principles and concepts of the present invention and generally designated by the reference numeral 10 will be described.

As best illustrated in FIGS. 1 through 6, the Brake Drum Cooling Device 10 comprises an elongated band 20 secured in an end-to-end manner externally around a brake drum 2. The elongated band 20 includes a plurality of air scoops 30 formed unitarily thereon wherein each of the air scoops 30 capture and direct air across the exterior surface of the brake drum 2 when the brake drum 2 is rotated in a forward direction.

As best illustrated in FIG. 1, the Brake Drum Cooling Device 10 is adapted for installation on a brake drum 2 provided at one end of a rear axle 1 of a vehicle. The brake drum 2 includes a generally upright annular wall 3 and a generally cylindrical wall 4 extending inwardly from the outer periphery of the annular wall 3. The cylindrical wall 4 has an interior surface 5 and an exterior surface 6 as well as an interior edge 7 and an exterior edge 8.

Figure 2:
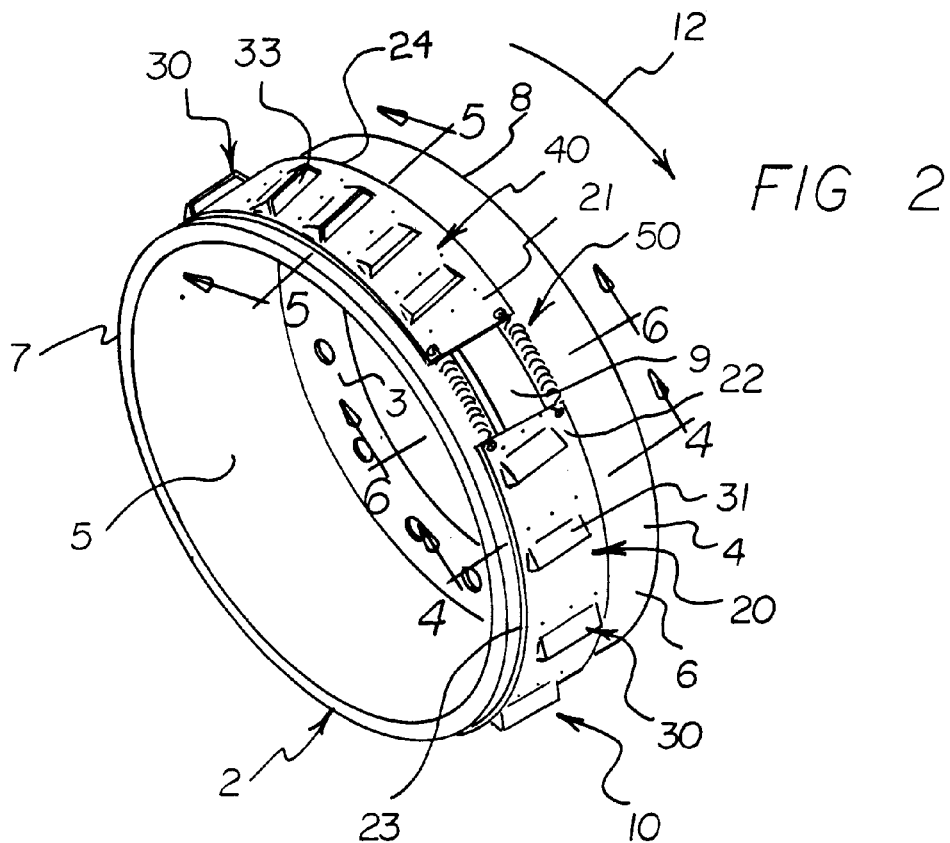
FIG. 2 is a perspective view of the Brake Drum Cooling Device of the present invention installed on a brake drum on the left side of a vehicle.
Figure 3:
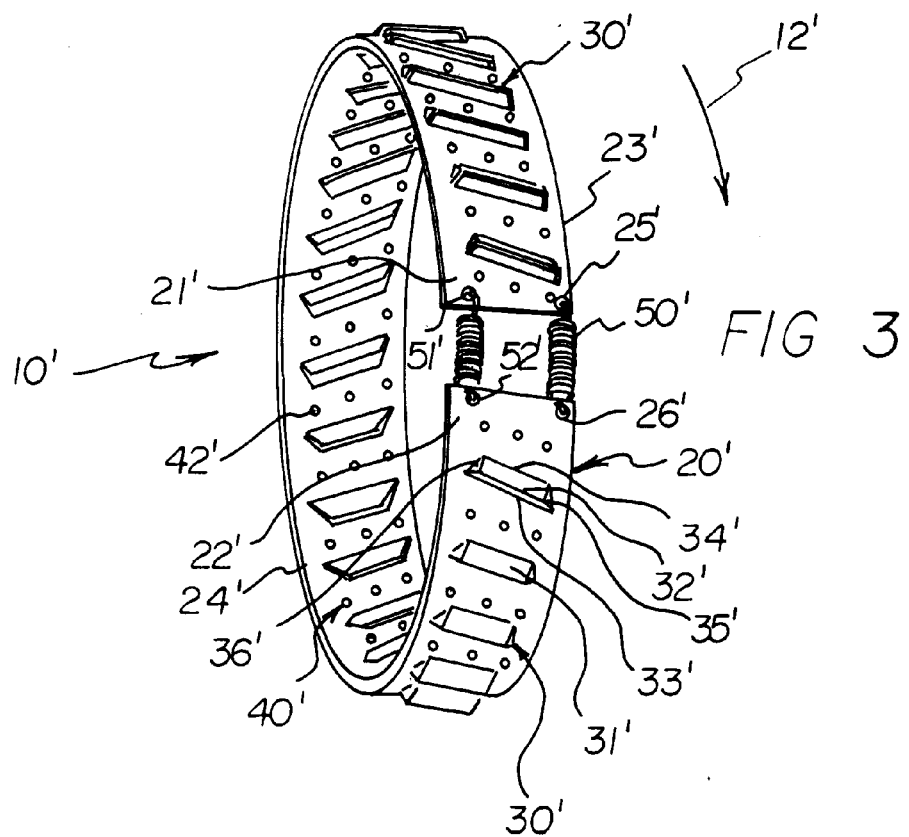
FIG. 3 is a perspective view of the Brake Drum Cooling Device of the present invention for installation on a brake drum on the right side of a vehicle.
Figure 4:
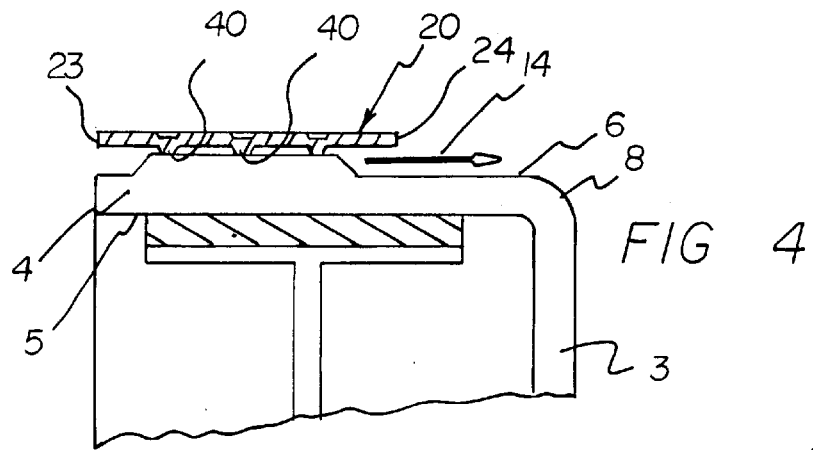
FIG. 4 is a cross sectional view taken along line 4—4 of FIG. 2.
Figure 5:
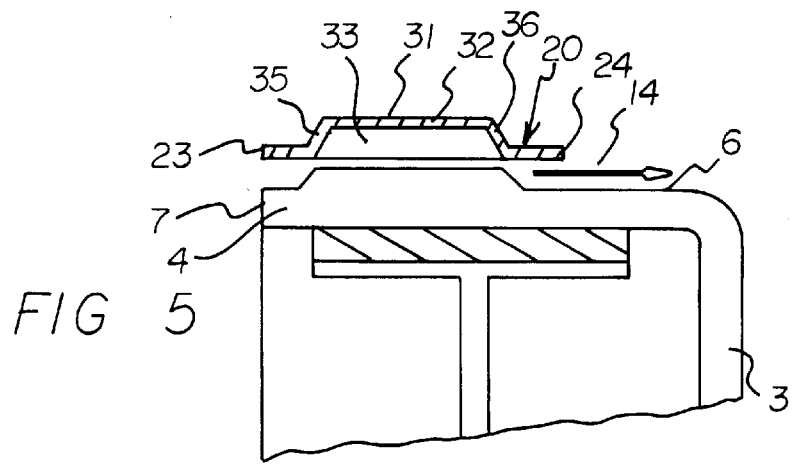
FIG. 5 is a cross sectional view taken along line 5—5 of FIG. 2.
Figure 6:
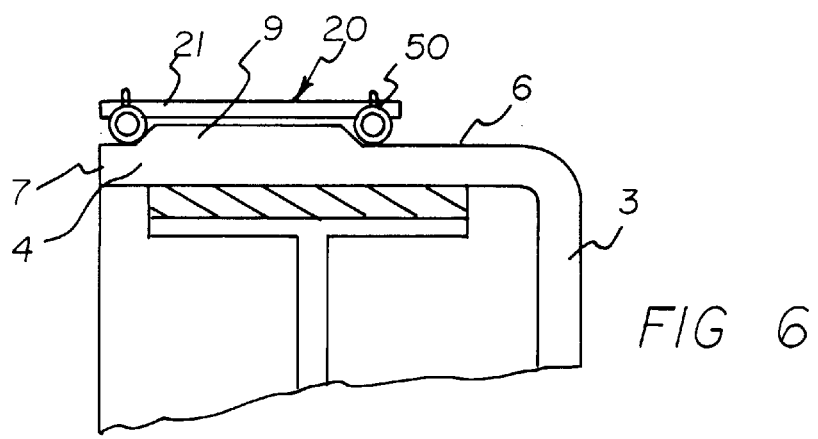
FIG. 6 is a cross sectional view taken along line 6—6 of FIG. 2.

The Brake Drum Cooling Device 10, shown in FIG. 2, is installed on a brake drum 2 provided on the left side of the vehicle and is designed for rotation in the direction of arrow 12. A similar Brake Drum Cooling Device 10', shown in FIG. 3, is constructed as a mirror image of device 10. As such, device 10' is adapted for installation on a brake drum 2' provided on the right side of the vehicle and is designed for rotation in the direction of arrow 12'. While this description will be directed to the Brake Drum Cooling Device 10, it is understood, however, that like numerals refer to like parts of each device.

The elongated band 20 has a first end 21 and a second end 22 as well as an inner edge 23 and an outer edge 24. The plurality of air scoops 30 are arranged in spaced relation along the elongated band 20 from substantially the first end 21 to the second end 22. Furthermore, each of the air scoops 30 extend across the width of the elongated band 20 from substantially the inner edge 23 to the outer edge 24.

The elongated band 20 also includes a plurality of inwardly projecting dimples 40. Preferably, the plurality of inwardly projecting dimples 40 comprises a plurality of sets of dimples 42 arranged in spaced relation along the elongated band 20 from substantially the first end 21 to the second end 22. Each set of dimples 42 is positioned between two air scoops. In the preferred embodiment, each set of dimples 42 comprises three spaced and aligned dimples extending across the width of the elongated band 20.

Accordingly, each of the dimples 40 abut the exterior surface 6 of the cylindrical wall 4 and elevate the elongated band 20 above the cylindrical wall 4 when the elongated band 20 is secured around the brake drum 2. As such, the dimples 40 allow air to flow between the elongated band 20 and the brake drum 2. Thus, air captured by each of the air scoops 30 is forced under the elongated band 20 and outward therefrom across the exterior surface 6 of the cylindrical wall 4 of the brake drum 2.

In the preferred embodiment, each of the air scoops 30 comprise an outwardly directed projection 31 protruding above an adjacent segment of the elongated band 20. The projection 31 has an open leading edge 32 forming an air-intake opening 33 and a closed trailing edge 34 unitary with the elongated band 20. Accordingly, the open leading edge 32 is arranged ahead of the closed trailing edge 34 when the Brake Drum Cooling Device 10 is rotated in the forward direction. Furthermore, the projection 31 has a closed inner side 35 unitary with the elongated band 20 adjacent the inner edge 23 thereof and a closed outer side 36 unitary with the elongated band 20 adjacent the outer edge 24 thereof.

Preferably, each of the air scoops 30 traverse the elongated band 20 at an oblique angle thereto. Accordingly, the closed inner side 35 of the projection 31 is arranged slightly ahead of the closed outer side 36 of the projection 31 when the Brake Drum Cooling Device 10 is rotated in the forward direction. As such, each of the air scoops 30 tend to direct air outwardly across the exterior surface 6 of the cylindrical wall 4 towards the exterior edge 8 of the cylindrical wall 4, as indicated by arrow 14, when the brake drum 2 rotates in the direction of arrow 12.

Preferably, the elongated band 20 is secured around the brake drum 2 by a pair of tension springs 50. Each of the tension springs 50 have a first end 51 attached to the first end 21 of the elongated band 20 and a second end 52 attached to the second end 52 of the elongated band 20. Accordingly, the elongated band 20 has a first pair of holes 25 therein at the first end 21 thereof and a second pair of holes 26 therein at the second end 22 thereof. Preferably, the elongated band 20 is secured around the exterior surface 6 of the cylindrical wall 4 such that inner edge 23 of the elongated band 20 is generally aligned with the interior edge 7 of the cylindrical wall 4.

Typically, the exterior surface 6 of the cylindrical wall 4 of the brake drum 2 includes a raised ridge 9. As such, each of the dimples 40 rest on the raised ridge 9 and the pair of tension springs 50 are each positioned on opposite sides of the raised ridge 9 so as to further retain the Brake Drum Cooling Device 10 on the brake drum 2.

In use, the elongated band 20 is externally secured around the cylindrical wall 4 of the brake drum 2. When the vehicle is in forward motion, the brake drum 2 and the elongated band 20 rotate in the direction of arrow 12. As the brake drum 2 and the elongated band 20 rotate, each of the air scoops 30 capture and direct air across the exterior surface 6 of the cylindrical wall 4. As such, the constant air flow across the cylindrical wall 4 dissipates heat from the brake drum 2.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A device for cooling a brake drum mounted for rotation in a forward direction, said brake drum including a cylindrical wall having an exterior surface, said device comprising:
   an elongated band adapted for being secured in an end-to-end manner externally around said brake drum;
   said elongated band including a plurality of air scoops formed thereon, each of said air scoops capturing and directing air across said exterior surface of said brake drum when said brake drum is rotated in said forward direction; and
   wherein each of said air scoops is positioned at an oblique angle to a longitudinal axis of said elongated band.

2. The device of claim 1, further comprising:
   an elevation means for elevating said elongated band above said exterior surface of said cylindrical wall of said brake drum.

3. The device of claim 2, wherein said elevation means comprises:
   a plurality of inwardly projecting dimples formed in said elongated band, each of said dimples being adapted for abutting said exterior surface of said cylindrical wall and elevating said elongated band above said brake drum when said elongated band is secured around said brake drum.

4. The device of claim 3, wherein said plurality of inwardly projecting dimples comprises:
   a plurality of sets of dimples arranged in spaced relation along said elongated band, each set of dimples being arranged between two of said air scoops.

5. The device of claim 1, wherein each of said air scoops comprise an outwardly directed projection having an open leading edge forming an air-intake opening, and a closed trailing edge unitary with said elongated band,
   said open leading edge arranged ahead of said closed trailing edge when said elongated band is rotated in said forward direction.

6. The device of claim 5, wherein each of said air scoops have a closed inner side unitary with said elongated band, and a closed outer side unitary with said elongated band.

7. The device of claim 1, further comprising:
   a securement means for securing said elongated band around said exterior surface of said cylindrical wall of said brake drum.

8. The device of claim 7, wherein said securement means comprises:
   a tension spring having a first end attached to one end of said elongated band and a second end attached to an opposite end of said elongated band.

9. The device of claim 1, wherein each of said scoops substantially traverse said elongated band.

10. A device for cooling a brake drum mounted for rotation in a forward direction, said brake drum including a cylindrical wall having an exterior surface, said device comprising:
    an elongated band;
    said elongated band including a plurality of air scoops arranged in spaced relation thereon, each of said air scoops capturing and directing air across said exterior surface of said brake drum when said brake drum is rotated in said forward direction;
    a securement means for securing said elongated band around said exterior surface of said cylindrical wall of said brake drum;
    an elevation means for elevating said elongated band above said exterior surface of said cylindrical wall of said brake drum;
    wherein each of said air scoops comprise an outwardly directed projection having an open leading edge forming an air-intake opening, a closed trailing edge unitary with said elongated band, a closed inner side unitary with said elongated band, and a closed outer side unitary with said elongated band; and
    said open leading edge arranged ahead of said closed trailing edge and said closed inner side arranged ahead of said closed outer side when said elongated band is rotated in said forward direction.

11. The device of claim 10, wherein said securement means comprises:

a tension spring having a first end attached to one end of said elongated band and a second end attached to an opposite end of said elongated band.

12. A device for cooling a brake drum mounted for rotation in a forward direction, said brake drum including a cylindrical wall having an exterior surface, said device comprising:

an elongated band;

said elongated band including a plurality of air scoops arranged in spaced relation thereon, each of said air scoops capturing and directing air across said exterior surface of said brake drum when said brake drum is rotated in said forward direction;

a securement means for securing said elongated band around said exterior surface of said cylindrical wall of said brake drum;

an elevation means for elevating said elongated band above said exterior surface of said cylindrical wall of said brake drum;

wherein said elevation means includes a plurality of inwardly projecting dimples formed in said elongated band, each of said dimples being adapted for abutting said exterior surface of said cylindrical wall and elevating said elongated band above said brake drum when said elongated band is secured around said brake drum.

13. The device of claim 12, wherein said plurality of inwardly projecting dimples comprises:

a plurality of sets of dimples arranged in spaced relation along said elongated band, each set of dimples being arranged between two of said air scoops.

14. The device of claim 12, wherein said securement means comprises:

a tension spring having a first end attached to one end of said elongated band and a second end attached to an opposite end of said elongated band.

15. A device for cooling a brake drum mounted for rotation in a forward direction, said brake drum including a cylindrical wall having an exterior surface, said device comprising:

an elongated band having a first end and a second end, said elongated band encircling said cylindrical wall of said brake drum; and a securement means for securing said first end of said elongated band to said second end of said elongated band when said elongated band encircles said cylindrical wall of said brake drum, said elongated band including a plurality of air scoops arranged in spaced relation thereon, each of said air scoops capturing and directing air across said exterior surface of said brake drum when said brake drum is rotated in said forward direction, said elongated band including a plurality of inwardly projecting dimples, each of said dimples being adapted for abutting said exterior surface of said cylindrical wall and elevating said elongated band above said brake drum when said elongated band is secured around said brake drum, whereby said plurality of inwardly projecting dimples permit air flow between said elongated band and said brake drum.

16. The device of claim 15, wherein said elongated band has an inner edge and an outer edge, and wherein said elongated band is secured around said exterior surface of said cylindrical wall such that said inner edge of said elongated band is generally aligned with an interior edge of said cylindrical wall.

17. The device of claim 16, wherein each of said air scoops comprise an outwardly directed projection having an open leading edge forming an air-intake opening, a closed trailing edge unitary with said elongated band, a closed inner side unitary with said elongated band adjacent said inner edge thereof, and a closed outer side unitary with said elongated band adjacent said outer edge thereof, said open leading edge arranged ahead of said closed trailing edge when said elongated band is rotated in said forward direction, each of said air scoops substantially traversing said elongated band at an oblique angle thereto wherein said closed inner side is arranged ahead of said closed outer side when said elongated band is rotated in said forward direction.

18. The device of claim 15, wherein said plurality of inwardly projecting dimples comprises:

a plurality of sets of dimples arranged in spaced relation along said elongated band, each set of dimples being arranged between two of said air scoops.

19. The device of claim 18, wherein each set of dimples comprises three spaced and traversely aligned dimples.

20. The device of claim 15, wherein said securement means comprises:

a tension spring having a first end attached to said first end of said elongated band and a second end attached to said second end of said elongated band.

* * * * *